(12) United States Patent
Guidi et al.

(10) Patent No.: US 7,418,416 B2
(45) Date of Patent: Aug. 26, 2008

(54) GAMMA TRADING TOOL

(75) Inventors: Giovanni Guidi, London (GB); Marco Stephan Pauletti, Zurich (CH)

(73) Assignee: Morgan Stanley, New York, NY (US)

( * ) Notice: Subject to any disclaimer, the term of this patent is extended or adjusted under 35 U.S.C. 154(b) by 1147 days.

(21) Appl. No.: 09/885,352

(22) Filed: Jun. 20, 2001

(65) Prior Publication Data
US 2003/0069826 A1    Apr. 10, 2003

(51) Int. Cl.
*G06Q 40/00*    (2006.01)
(52) U.S. Cl. .......................... 705/36 R; 705/37; 705/35
(58) Field of Classification Search .................. 705/37, 705/36 R, 35
See application file for complete search history.

(56) References Cited

U.S. PATENT DOCUMENTS

| | | | |
|---|---|---|---|
| 5,126,936 A | 6/1992 | Champion et al. | 364/408 |
| 5,799,287 A | 8/1998 | Dembo | 705/36 |
| 5,809,484 A | 9/1998 | Mottola et al. | |
| 5,884,286 A | 3/1999 | Daughtery, III | 705/36 |
| 6,021,402 A | 2/2000 | Takriti | |
| 6,061,662 A | 5/2000 | Makivic | |
| 6,134,536 A | 10/2000 | Shepherd | |
| 6,173,276 B1 | 1/2001 | Kant et al. | |
| 6,418,419 B1 * | 7/2002 | Nieboer et al. | 705/37 |
| 6,470,321 B1 | 10/2002 | Cumming et al. | 705/4 |
| 2002/0178101 A1 | 11/2002 | Swift | 705/36 |
| 2003/0069821 A1 | 4/2003 | Williams | 705/36 |

OTHER PUBLICATIONS

Int'l Preliminary Examination Report for PCT/US02/19564 dated Dec. 12, 2003.
Int'l Search Report for PCT/US02/19564 dated Jul. 21, 2003.
Francesco, S. Allocation of Risk Capital in Financial Institutions [online], Autumn 1999 [retrieved on Jun. 11, 2001]. Retrieved from the Internet:<URL: http://www.dialogweb.com/search.htl>.
Saikat, N. and Waggoner, D. Issues in Hedging Options Positions [online], Jan. 2000 [retrieved on Jun. 7, 2001]. Retrieved from the Internet:<URL: http://www.lexis.com/research/retrieve>.

(Continued)

*Primary Examiner*—Mary Cheung
*Assistant Examiner*—Kirsten S Apple
(74) *Attorney, Agent, or Firm*—Isabel Cantallops; Clifford Chance US LLP (57) ABSTRACT

Automated hedging of financial instruments can include the automated generation of orders to hedge a financial exposure associated with a first financial instrument (e.g., to hedge a risk associated with the value of an option). The hedging orders include buy and sell orders to acquire long or short positions in a hedging instrument having a price movement that is correlated with price movements of the first financial instrument. The long and short positions are acquired so as to offset modeled changes in value of the first financial instrument. After an initial hedging order to buy or sell stock is filled by an exchange, subsequent hedging orders may be generated. Pricing and quantity for the subsequent hedging orders may be based on a user-specified movement in the price of the second financial instrument and may be automatically modified in response to price trending of the market with respect to the second financial instrument.

26 Claims, 3 Drawing Sheets

OTHER PUBLICATIONS

Jameson, M. and Wilhelm, M. Market Making in the Options Markets and the Costs of Discrete Hedge Rebalancing [online], Jun. 1992 [retrieved on Jun. 8, 2001]. Retrieved from the Internet:<URL: http://www.dialogweb.com/cgi/dwclie>.

S&P ComStock/Micro Hedge Windows: Results Rooted in Raliability [online], Annual 1993 [retrieved on Jun. 11, 2001]. Retrieved from the Internet:<URL: http://www.dialogweb.com/cgi/dwclie>.

Duarte, A. Optimal Value at Risk Hedge Using Simulation Methods [online], Winter 1998 [retrieved on Jun. 7, 2001]. Retrieved from the Internet:<URL: http://www.lexis.com/research/retrieve>.

Duarte, A. Optimal Value at Risk Hedge Using Simulation Methods [online], Winter 1998 [retrieved on Jun. 7, 2001]. Retrieved from the Internet:<URL: http://www.lexis.com/research/retrieve>.

\* cited by examiner

GAMMA TRADING TOOL

BACKGROUND OF THE INVENTION

An equity options trading desk of a financial institution frequently buys and sells options for customers and for proprietary trading. An option C is a contract between two parties that gives the buyer the right, but not the obligation, to purchase or sell a specified asset S (called the underlying asset) at a later date at an agreed upon price K (called the strike price). An option to buy the asset is referred to as a call, an option to sell the asset is referred to as a put. The purchase and sale of options involves several types of risk for the investor. One of the risks associated with options is directional risk. Directional risk is a risk that the value of an option or a portfolio of options will be negatively affected by changes in the value of the underlying asset. Financial institutions may reduce directional risk through a number of techniques, one of which is delta-hedging of the option position. Delta hedging involves buying and selling the underlying asset based on the rate of change in the price of an option with respect to the price of the underlying asset (i.e., based on the delta ($\Delta$) of the instrument). Delta is defined as the first partial derivative of the option price C with respect to the stock price S. In mathematical terms, delta is expressed as follows:

$$\Delta = \frac{\partial C}{\partial S},$$

Assuming that a delta value is constant, if the price of a particular stock changes by an amount (X), then an option on that stock will change by ($\Delta$) times (X). Thus, if the delta of a call option is 0.4, and the stock price changes by \$1 then the option price is expected to change by about 40% of that amount (\$0.40). In this case, if an investor holds one call option and sells short $\Delta$ of the underlying stock (a "hedge position" on the investment), the investor will be immunized against changes in the option price due to small movements of the stock price.

In practice, the delta of an option is not constant. Thus, as the stock price changes, the delta likewise changes. When the change in the stock price becomes fairly large, the delta itself will change significantly. To maintain immunization against changes in the option price, the investor will need to adjust the hedge position. If, for example, the trader established an initial hedge position at an initial delta value of $\Delta_0$ and the changed delta value becomes $\Delta_1$, then the trader will need to adjust the hedge position by the difference ($\Delta_0 - \Delta_1$) between the original and new delta values. If the difference is positive, the investor will need to purchase ($\Delta_0 - \Delta_1$) shares of stock for each option position; if the difference is negative, the investor will need to sell ($\Delta_0 - \Delta_1$) shares. This whole process of frequent adjustments is called delta-hedging and continues until option maturity or until the trader sells the option back to the market.

As a practical matter, to apply delta hedging, a trader must be able to approximate the change in delta as the price of a stock changes. The change in delta may be approximated based on the Gamma ($\Gamma$) of the option. Gamma is a measure of the rate of change of delta with respect to changes in the price of the underlying asset. Gamma is defined as the first partial derivative of delta with respect to the stock price S. By extension, $\Gamma$ is equivalently defined as the second partial derivative of the option price C with respect to the stock price S. In mathematical terms, gamma is expressed as follows:

$$\Gamma = \frac{\partial \Delta}{\partial S} = \frac{\partial C^2}{\partial^2 S},$$

For a change in stock price of ($S_0 - S_1$), where $S_0$ is the initial stock price and $S_1$ is the new stock price, and assuming that the gamma ($\Gamma$) of an option tends to remain relatively constant with respect to changes in stock price during a trading day, the change in value of the delta (which determines the quantity of stock to be purchased or sold to maintain a hedge position) can be approximated as follow:

$$\Delta_0 - \Delta_1 \approx \Gamma \times (S_0 - S_1)$$

If there is an unusually large change in stock price, or if the option is close to maturity with S close to K, the assumption of a constant gamma may be inappropriate and intra-day adjustments to the gamma value may be required.

Figure 1:
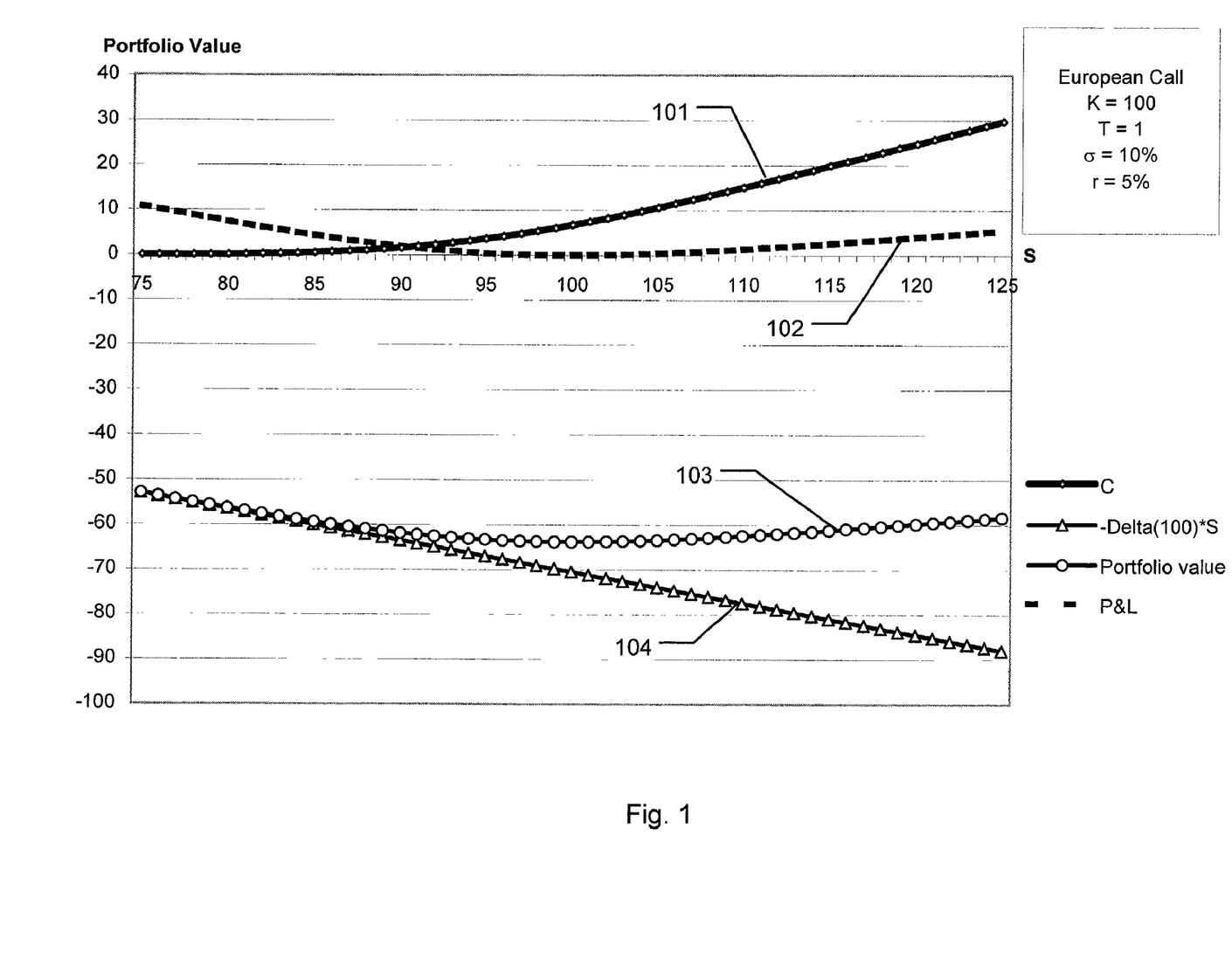
FIG. 1 is a graph of stock and option pricing data.

If a trader has bought a plain call or put option, then the gamma of the option position is positive (commonly referred to as "long gamma"). FIG. 1 shows a simple long gamma position for a plain vanilla European Call option with a strike price K=100, a time to maturity T=1 year, on a stock with a current price S=100, a volatility $\sigma$=10%, and a riskless rate r=5% (riskless rates are the government bonds interest rates). Line 101 ("C") shows the price of the call option with respect to stock price S (shown as the X axis). The price of the option 101 forms a curve and a measure of the curvature (i.e. non-linearity) of the line at any particular point is its gamma. Line 104 shows the value of an initial quantity of stock ($\Delta$) that was sold short by the trader to hedge the option position. The value of the quantity of stock ($\Delta$) sold short 104 is shown as decreasing linearly when the option price is increasing, and increasing linearly when the option price is decreasing. This linear behavior of ($\Delta$) provides a relatively good hedge for a small movement of the stock price.

Line 103 shows the combined value of the long option position 101 and the short $\Delta$ stock 104 when there is no rebalancing of the short position $\Delta$ 104. Due to the curvature of the option price given by the gamma, this combination will produce a profit (line 102). This profit 102 is usually called long gamma trading profit. If, when the option matures, this profit is greater than the premium paid to buy the call option, then the trader will have made a gain, otherwise there will be a loss. A gamma trading strategy tries to maximize the profit or minimize the loss generated by the delta hedging of an option position.

For a gamma trading strategy, the magnitude and frequency of the swings of the stock price (which can be measured in relation to an initial reference price such as the initial stock price "S" or the initial strike price "K") typically has a more significant effect on profit and loss than does the direction of the stock movement. This magnitude and frequency is measured by the realized volatility of the stock during the lifetime of the option, ($\sigma_r$). If the realized volatility ($\sigma_r$) is greater than the volatility implied by the option price when the option was bought ($\sigma$), then the strategy will have a profitable outcome. It is noted that implied volatility ($\sigma$) may be calculated using the well-known Black-Scholes model.

If a trader is primarily interested in closely hedging several option positions each with a long gamma, the trader has to frequently monitor the price of the several underlying stocks and rebalance the hedge position for each stock by buying or selling an amount of stock ($\Delta_0 - \Delta_1$) in response to changes in each stock price. Manual re-balancing of a hedge position in this manner can be time consuming as it requires the option trader to closely monitor the prices of all the stocks in the trader's portfolio. Furthermore, to ensure that desired hedging trades are executed, a trader may resort to buying at the best offer price (rather than placing a limit order at the lower best bid price), or selling at the best bid price (rather than placing a limit order at a higher best offer price). This buying at the best offer price and selling at the best bid price, referred to as paying the bid-ask spread, may reduce the trader's profitability.

Delta hedging and gamma trading are explained in greater detail in, e.g., Baz Jamil, Vasant Naik, David Prieul, Vlad Putyatin, Francis Yared, *Selling risk at a premium*, Risk, December 2000, pages 135-138; Hull John, *Introduction to Futures and Options Markets*, second edition, Prentice Hall International Edition, 1995, pages 319-345.

SUMMARY OF THE INVENTION

Automated hedging of financial instruments is provided by computer-implemented systems and methods. The systems and methods provide for the automated generation of hedging orders to hedge a financial exposure associated with a first financial instrument (e.g., to hedge a risk associated with the value of an option). The hedging orders include buy and sell orders to acquire long or short positions in another financial instrument having a price movement that is correlated with price movements of the first financial instrument. The long and short positions are acquired to offset changes in value of the first financial instrument. After an initial buy or sell hedging orders is filled by an exchange, subsequent hedging orders may be generated. Pricing and quantity for the subsequent hedging orders may be based on a user-specified movement in the price of the second financial instrument and may be automatically modified in response to price trending of the market with respect to the second financial instrument.

Implementations may provide for continuous monitoring of hedging orders, automatic slicing of large orders into smaller orders (e.g., to avoid showing a big position to the market), customization of hedging strategy on a per-stock/per-account basis, assisting an option trader in performing effective market-making for a stock, avoidance of having to pay bid-ask spread, and trading based on intraday stock market-making activity to increase trading profit. The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 2:
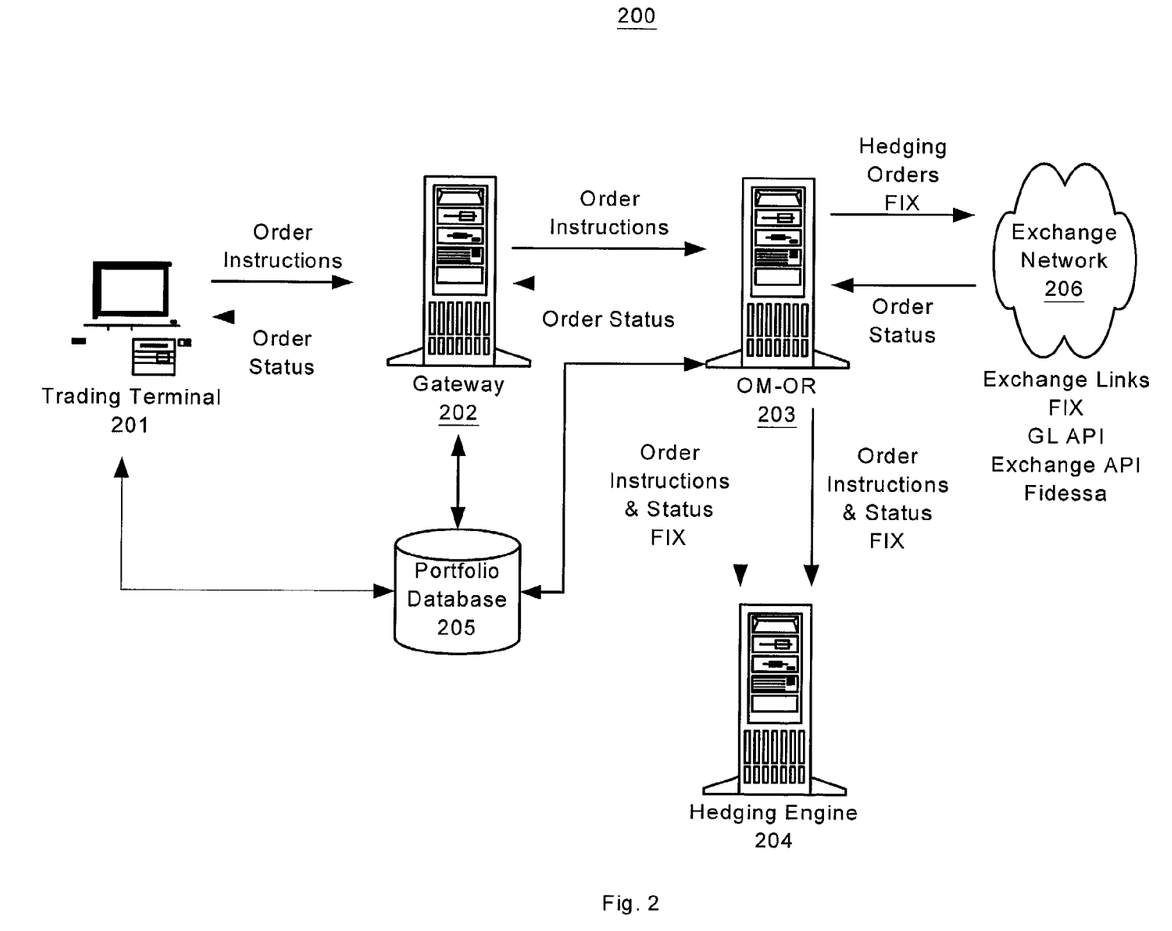
FIG. 2 is a trading system diagram.

FIG. 2 shows a trading platform 200 that provides real-time trading and order management features. The system 200 includes one or more trader terminals 201 providing an interface with which traders can view trading data and place trades to be executed by destination exchanges. Traders can also enter data at the terminals 201 to initiate the automatic generation of hedging orders by the platform 200.

The trading terminals 201 may be personal computers with a network interface enabling communications with other system components 202-205 (e.g., computers executing the Microsoft Windows operating system) and that are software-configured to provide an interface with which trading data can be displayed to a trader and trades entered. Communication between the terminal 201 and systems 202-205 may be by means of industry standard and/or proprietary protocols. For example, trading information may be communicated between the terminal 201 and other systems 202-205 using the Financial Information Exchange (FIX) message protocol. The FIX message protocol specifies command messages that are understood by stock exchange order entry systems. A detailed FIX protocol specification is available from the FIX Protocol Organization web site at www.fixprotocol.org. Alternatively, a proprietary protocol can be used by terminal 201 and subsequently reformatted or translated using a message protocol understood by a destination exchange. In the example implementation that follows, the terminal 201 uses a proprietary protocol whereby a simple text string containing trading data is generated and sent to a gateway computer 202 (e.g., "Buy 100 shares IBM at 100"). At the gateway computer 202, additional parameters may be added and further message formatting may be performed. For example, the trade order data from the terminal 201 may be formatted in accordance with the FIX protocol at the gateway 202.

After a FIX message is generated at the gateway 202, it is sent to an order management and routing system (OM-OR) 203. The OM-OR system maintains both the current and previous state of an order. For example, the OM-OR can submit orders over a network 206 to one or more destination exchanges, track the portion of an order that has been executed and, if a later instruction is received to reduce order size, the OM-OR will use the data about the executed portion to determine the amount by which the outstanding order portion is to be reduced. The OM-OR also may slice large orders into sizes acceptable by the particular exchange, add additional slice(s) to the order if an order size is increased, transmit order modification requests to destination exchanges, manage modification requests to ensure that they follow exchange rules, enable modification and cancellation of orders not yet released to an exchange, support timed release of orders, and translate or format FIX protocol message into an exchange link protocols compatible with a particular destination exchange (e.g., the GL API, Exchange API, or Fidessa protocols).

The OM-OR also receives real-time security pricing information from one or more exchanges. For securities listed on multiple exchanges, this information can be used to choose the exchange with the best price for a particular order. Such real-time information, as well as other account, order, and status data is accessible by the terminal 201 through messages exchanged between the terminal 201 and gateway 202 or directly between terminal 201 and the OM-OR 202. For example, the terminal 201 can query the OM-OR to determine all orders and their current execution state for a given account, exchange or range of execution identifiers.

To assist in the hedging of options portfolios, the OM-OR is connected to a hedging engine 204. The hedging engine 204 can automatically generate and place limit buy and sell orders with exchanges at calculated hedging levels. The hedging strategy implemented by the hedging engine 204 can be configured by a trader using a number of adjustable parameters. Thus, through the use of these parameters, the way in which the hedging engine reacts to market price volatility can be modified. The hedging strategy parameters, as well as other trading data, may be viewed and entered by a trader using the terminal 201. In one implementation, the terminal provides interface 300 (FIG. 3) for the display and entry of data. Other interfaces may also be used, e.g., the interface can be command-line based or a graphical user interface other than the one shown in FIG. 3. The trading terminal interface can display data about a trader's portfolios and the stocks used to hedge his directional risk, and can receive inputs from the trader to create custom hedging strategies for particular stock/portfolio combinations. For example, for each stock in each account managed by a trader, the trader may specify a different percentage price move that will trigger a hedging trade. Thus, in order to capture as much stock volatility as possible and maximize the profit, a small percentage move may be specified if the stock price is mean-reverting, and a large percentage move if the stock is trending. The trader can also introduce asymmetry around the reference price so that, after a few consecutive executions on the same side (buy or sell), the percentage move for the subsequent hedge is increased on the executed side and decreased on the other. The trader also can decide to hedge only a percentage of the delta change, thus taking a directional view.

Figure 3:
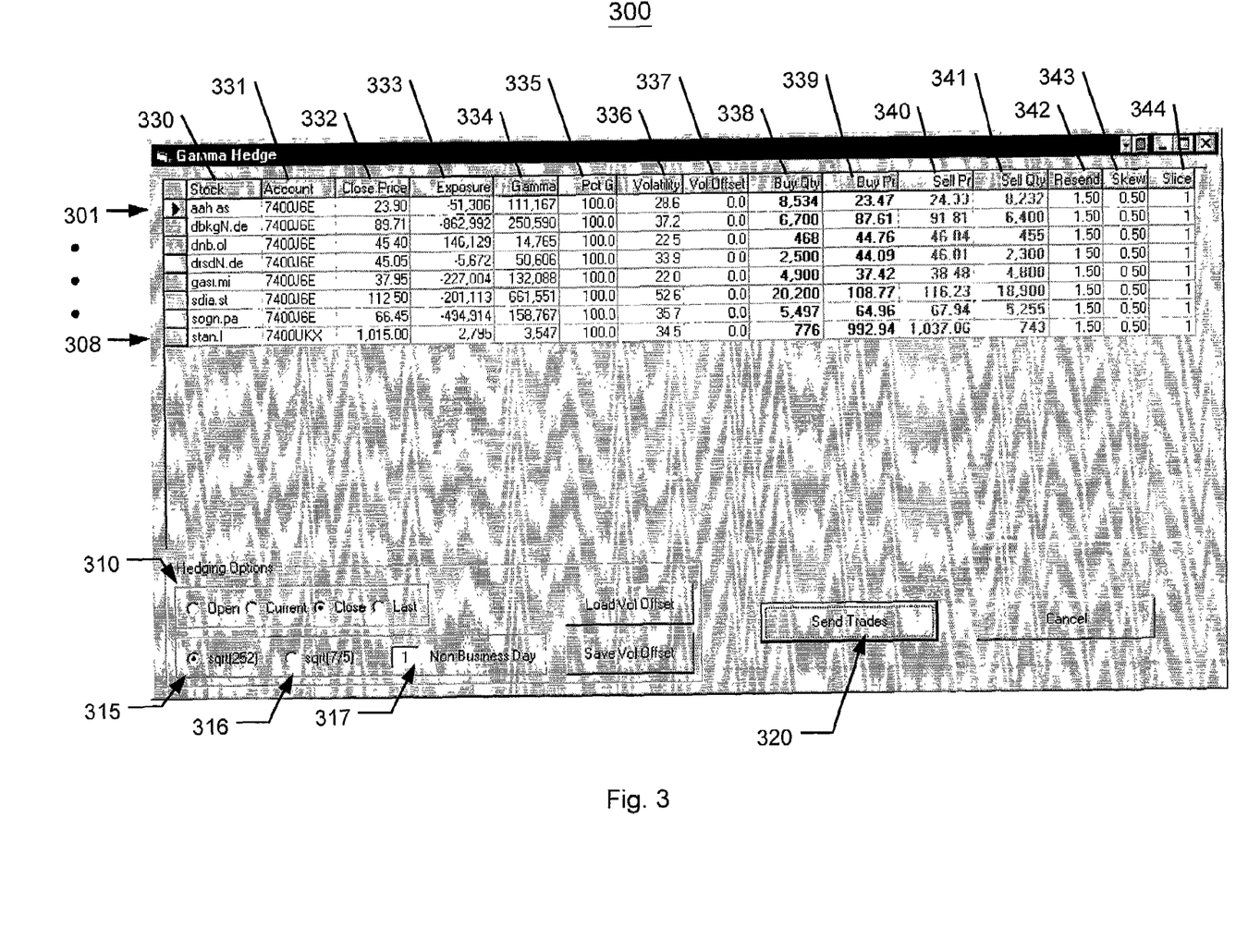
FIG. 3 is a trading interface.

In the FIG. 3 implementation, each row 301-308 of the trading terminal interface contains data specifying a hedging strategy for a different underlying stock/account combination. For example, row 301 specifies a hedging strategy that applies to the underlying stock identified by symbol "aah.as" in the account "7400J6E." Since each hedging strategy (i.e., each row 301-308) is specific to both an underlying stock and an account, a trader can trade the same instrument in different accounts using different strategies. To establish a hedging strategy, the trader must first specify particular underlying stocks in particular accounts he wants to use to hedge. In some implementations, this may be done by querying a risk management and position keeping application that will return the option's risk and volatility statistics (i.e., values of $\Delta$, $\Gamma$, and $\sigma$) aggregated by underlying stock (column 330 "Stock") and account (column 331 "Account").

The currency $\Delta$ ($\Delta$ multiplied by the price of the stock in local currency) of the option held on the underlying stock is shown in column 333 as the "Exposure." For example, the value "-51,306" in the Exposure column 333 of the row 301 indicates that 51,306 EUR of the stock "aah.as" were sold short in the account "7400J6E". The "Exposure" value is a measure of the initial directional risk associated with a particular stock/account combination. Other values that are automatically displayed at the interface include a reference price 332 (labeled "Close Price" in FIG. 2) and the "Gamma" 334. The gamma trading engine 204 uses the reference price 332 as a point about which swings in stock price are measured. The reference price may actually be set based on one of a number of different prices (e.g., the open, the current mid price (i.e., the average of the current buy and current ask price), previous session close, or the last trade price). Using radio buttons 310, the trader can specify, on a per-stock/per-account basis, whether to use the open, current mid, close or last price as the reference price 332.

The trading engine uses the "Gamma" value to determine the number of shares that must be bought or sold to maintain effective hedging. The Gamma value shown at interface 200 is expressed as the local currency (i.e. the currency in which the stock price is expressed) change in value of an option for a 1% move in the underlying stock price. For example, the Gamma value of "111,167" in row 301 means that for a 1% move in the price of the stock aah.as, the change in the value of an option on the stock "aah.as" in account 7400J6E is EUR 111, 167.

Other values displayed to the trader, or input by the trader, using the interface 300 include Pct G, Volatility, Vol Offset, Buy Qty, Buy Price, Sell Price, Sell Qty, Resend, Skew, and Slice (shown in columns 335-344, respectively).

The Pct G value (Percentage Gamma, column 335) specifies the percentage of the Gamma that the trader wishes to hedge. The Volatility value (column 336) specifies the Gamma weighted average of the annual implied volatilities of every option held on the underlying stock. This Gamma value may be automatically obtained from a risk management system (which may be part of the hedging engine 204). For example, the volatility value of 28.6 in column 335 row 301 means that, in the next year, the price of the instrument "aah.as" may rise or fall within an estimated ±28.6% range of the Close Price. The Vol Offset value enables trader-modification of the "Volatility" value by allowing manual increases or decreases of the Volatility value. As further explained, below, the value of Volatility plus Vol Offset is used by the gamma trading engine 204 to automatically calculate a percMove($\sigma$) parameter by converting the annual implied volatility to a daily volatility. Different formulas may be selected to convert from annual to daily volatility using radio buttons 315 or 316 and the NonBusinessDay parameter 317.

If button 315 ("sqrt(252)") is selected, then the daily volatility is calculated as:

$$percMove(\sigma) = \frac{Volatility + VolOffset}{\sqrt{252}} \times \sqrt{NonBusinessDay};$$

If button 316 ("sqrt(7/5)") is selected, then the daily volatility is calculated as:

$$percMove(\sigma) = \frac{Volatility + VolOffset}{\sqrt{365}} \times \sqrt{\frac{7}{5}} \times \sqrt{NonBusinessDay};$$

In addition to trading at the percMove ($\sigma$) point, the gamma trading system permits a trader to manually set an additional percentage value at which trading is to occur. This additional trading percentage value is input as the Resend value 342. The Resend value 342 corresponds to the fixed percMove value used by the gamma trading algorithm, below. Thus, for example, if the reference stock price is $100, the daily volatility is 10% (percMove($\sigma$)), and the Resend value (percMove) is 5%, then the gamma trading engine will generate a buy order at $90 and a sell order at $110 (the 10% values). If, for example, the buy order is fully executed, the gamma trading engine will then cancel any outstanding sell orders, establish a new reference price of $90, and set new buy and sell orders at 95% and 105% of the new reference price. The Skew value 343 corresponds to the "asym" parameter explained in the gamma trading algorithm, below. The Slice value 344 is used to determine the maximum size of a buy or sell order to be delivered to an exchange. Values of "Buy Qty", "Buy Price" "Sell Price" and "Sell Qty" (columns 338-341, respectively) are automatically calculated and displayed at the terminal 301. This automatic calculation may be performed at the terminal 201 using the following formulas:

Buy Price:=Reference Price*(100−percMove($\sigma$))/100.

Sell Price:=Reference Price*(100+percMove($\sigma$))/100.

Buy Qty:=(percMove($\sigma$)*Gamma)/Buy Price.

Sell Qty:=(percMove($\sigma$)*Gamma)/Sell Price.

In other implementations, these values may be calculated elsewhere in the system 300 (e.g., hedging engine 204) and provided to the terminal 201.

After the desired inputs are set, the trader can submit selected ones of the trading strategies to the hedging engine 204. This can be done by selecting particular input rows 301-308 corresponding to the stock/account combinations that the trader wishes to hedge, and then selecting the "Send Trades" button 320. The relevant strategy data is then sent to the hedging engine 204 (either directly or, e.g., via gateway 202). The hedging engine 204 uses the received strategy parameters, as well as real-time stock pricing data received over network 206 from stock exchanges, and order execution data managed by the OM-OR 203, to generate and manage the creation of buy and sell orders in a stock. This generation and management is performed using a gamma trading algorithm. The following is an implementation of the gamma trading algorithm, though other algorithms and modifications thereof may also be used (algorithm is shown in pseudocode):

For each hedging strategy, (i.e., each submitted row 301-308) the following starting inputs are provided to the hedging algorithm:

perc$\Gamma$: The perc$\Gamma$ parameter corresponds to the "Gamma" value of column 334 multiplied by the "Pct G" value of column 335.

refP: The refP (reference price) parameter corresponds to the "Close Price" value of column 332. The refP value may be the close, opening, last trade or current mid price of the stock.

percMove ($\sigma$): The percMove ($\sigma$) parameter corresponds to the daily volatility, calculated from the Volatility value (column 336) and the annual to daily volatility conversion algorithm configured by input 315-317. PercMove ($\sigma$) specifies the percentage movement in the underlying stock price at which the trader wants to hedge. For an initial trade, percMove($\sigma$) is a function of the implied

```
LongGammaHedge(percΓ,refP,percMove(σ),percMove,maxSize, asym)
{
    buyPrice := refP * (100 - percMove(σ)) / 100;
    sellPrice := refP * (100 + percMove(σ)) / 100;
    buyQty := (percMove(σ) * percΓ) / buyPrice;
    sellQty := (percMove(σ) * percΓ) / sellPrice;
    cumAsym := 0;
    do {
        qtyBought := 0;
        qtySold := 0;
        posDelta := 0; /* delta after one side is completely executed (almost always 0) */
        buy min(maxSize, buyQty - qtyBought) of stock at buyPrice;
        sell min(maxSize, sellQty - qtySold) of stock at sellPrice;
        do {
            wait for full fill;
            if fill is on buy side {
                posDelta := posDelta + fillQty;
                qtyBought := qtyBought + fillQty;
                cumAsym := cumAsym - asym;
                buy min(maxSize, buyQty - qtyBought) of stock at buyPrice;
            } else {
                posDelta := posDelta - fillQty;
                qtySold := qtySold + fillQty;
                cumAsym := cumAsym + asym;
                sell min(maxSize, sell Qty - qtySold) of stock at sellPrice;
        } while qtyBought < buyQty and qtySold < sellQty;
        /* if the buy side was completely filled */
        if (qtyBought = buyQty)
            /* if we received a partial fill on the sell side we will be short posDelta shares */
            posDelta := posDelta - buyQty;
        else
            /* if we received a partial fill on the buy side we will be long posDelta shares */
            posDelta := posDelta + sellQty;
        cancel the unfilled order;
        refP := fill price;
        asymToUse := 0;
        /* if we had at least two fills on a row on the same side then asymToUse <> 0 */
        if cumAsym> asym
            asymToUse := cumAsym - asym;
        else if cumAsym < -asym
            asymToUse := cumAsym + asym;
        buyPrice := refP * (100 – percMove + asymToUse) / 100;
        sellPrice := refP * (100 + percMove + asymToUse) / 100;
        buyQty := min[(percMove * percΓ) / buyPrice - posDelta, 1];
        sellQty := min[(percMove * percΓ) / sellPrice + posDelta, 1];
    } while trader doesn't cancel the orders and abs(asymToUse) < percMove;
}
``` volatility of the options on the stock. For subsequent trades, this value may be fixed by the trader (this trader-specified value represented in the gamma trading algorithm as "percMove"). The subsequent trade value, percMove, corresponds to the "Resend" value (column 342) entered by the trader.

maxSize: The maxSize parameter specifies the maximum size of a trade that a trader wants to show to the market. The maxSize is calculated as a function of the initial buy or sell order size determined by the gamma trading algorithm and the Slice value (column 344). In some implementations, the trader may directly input the maxSize value (e.g. as an alternative to the number of slices value in column 344).

asym: The asym parameter (column 343) specifies an asymmetry in the spread around the reference price refP. The asym parameter can be used to modify the trading strategy in cases where the market price for a particular stock is trending.

The operation of this algorithm will now be explained by example. Consider, for example, the execution of the gamma trading algorithm with the following parameter values: percΓ=1000, refP=100, percMove(σ)=3%, percMove=1.5%, maxSize=16, asym=0.5). When the hedging algorithm is processed by the engine 204, an initial sequence of buy/sell hedging orders is generated (shown as "$1^{st}$ Hedge Sequence"), below.

| $1^{st}$ Hedge Sequence |
| --- |
| buy Qty=31, sell Qty = 29; |
| buy 16 stock at 97;         // Submit $1^{st}$ slice of the first buy order to the exchange. |
| sell 16 stock at 103;        // Submit $1^{st}$ slice of the first sell order to the exchange. |
| filled on buy 16 stock at 97;   // $1^{st}$ slice of the first buy order filled by the exchange. |
| buy 15 stock at 97;         // Submit $2^{nd}$ slice of the first buy order to the exchange |
| filled on buy 15 stock at 97;   // $2^{nd}$ slice of the first buy order filled by the exchange. |
| cancel sell order 16 of stock at 103;   // Cancel outstanding sell order. |

As shown by the "$1^{st}$ Hedge Sequence", based on the initial parameter data, the gamma trading algorithm will determine that for a particular underlying stock the appropriate hedging buy quantity is 31 shares at a price of 97, and the sell quantity is 29 shares at a price of 103. However, the maxSize parameter limits the maximum trading order size to 16. Therefore, the buy and sell quantities will be submitted to the exchange as a number of different segments (in this case, two). Assuming that the first buy order is filled (i.e., executed by an exchange), a second buy order is generated for the remaining fifteen shares and submitted to the exchange. If the second buy order is then filled, the outstanding sell order is cancelled.

After the first hedging sequence has been completed (either because the entire sell or buy order was executed), a new reference price is automatically determined. Where, as here, the hedge was completed through filling of the buy order, the next reference price will be the buy price at which the order was filled (i.e., 97). Similarly, if the hedge was completed through the filling of the sell order, the next reference price will be the sell price at which the order was filled, and the volatility percentage percMove (i.e., the "Resend" value of column 342) controls the generation of hedging orders. Using this data, and based on the completion of the 1st Hedge sequence as described above, the following hedge sequence is generated:

| The $2^{nd}$ Hedge Sequence |
| --- |
| refP=97, buyQty= 16, sellQty = 15, asymToUse=0; |
| buy 16 stock at 95.55; |
| sell 15 stock at 98.45; |
| filled on buy 16 stock at 95.55; |
| cancel sell order 15 of stock at 98.45; |

For this $2^{nd}$ Hedge Sequence, the gamma trading algorithm determines that the buy quantity is to be set to 16 and the sell quantity to 15. Here, as with the $1^{st}$ Hedge Sequence, the orders are filled on the buy side.

A third hedge sequence may then be generated. This third example illustrates the effect of a non-zero asymToUse value (i.e., a non-zero Skew value in column 343).

| $3^{rd}$ Hedge Sequence |
| --- |
| refP=95.55, buyQty=21, sellQty = 10, asymToUse=−0.5%; |
| buy 16 stock at 93.64;          // $1^{st}$ slice |
| sell 10 stock at 96.51; |
| filled on buy 16 stock at 93.64; |
| buy 5 stock at 93.64;           // $2^{nd}$ slice |

| -continued |
| --- |
| $3^{rd}$ Hedge Sequence |
| filled on buy 5 stock at 93.64; |
| cancel sell order 10 of stock at 96.51; |

In the following hedging sequences the asymToUse value is further increased based on the Skew (column 343) until the algorithm terminates:

| $4^{th}$ Hedge Sequence |
| --- |
| refP=93.64, buyQty=27, sellQty = 5, asymToUse=−1%; |
| buy 16 stock at 91.3;           // $1^{st}$ slice |
| sell 5 stock at 94.1; |
| filled on sell 5 stock at 94.1; |
| cancel buy order 16 of stock at 91.3; |
| $5^{th}$ Hedge Sequence |
| refP=94.1, buyQty=22, sellQty = 11, asymToUse=−0.5%; |
| buy 16 stock at 92.22;          // $1^{st}$ slice |
| sell 11 stock at 95.04; |
| filled on buy 16 stock at 92.22; |
| buy 6 stock at 92.22;           // $2^{nd}$ slice |
| filled on buy 6 stock at 92.22; |
| cancel sell order 11 of stock at 95.04; |

-continued

6<sup>th</sup> Hedge Sequence refP=92.22, buyQty=28, sellQty = 5, asymToUse=−1%;
    buy 16 stock at 89.91;        // 1<sup>st</sup> slice
    sell 5 stock at 92.68;
    filled on buy 16 stock at 89.91;
    buy 12 stock at 89.91;        // 2<sup>nd</sup> slice
    filled on buy 12 stock at 89.91;
    cancel sell order 5 of stock at 92.68;

7<sup>th</sup> Hedge Sequence
    asymToUse=−1.5% which is equal to percMove, therefore STOP In some implementations, the gamma trading algorithm can include a number of enhancements for "real market" functioning. For example, an implementation may include checks on the min and max quantity to buy and sell, rounding on the ticksizes and the lotsizes, a delta adjustment to handle transactions in which the trading engine processes a full fill on one side and a partial fill on the other side. Furthermore, the algorithm may be implemented in an event-driven manner to respond to events generated by the trader or arising due to market and exchange activity. The following are some example events that may drive the algorithm:

Events generated in response to activity by a trader include:
1. New Order—A new trading order or hedging strategy is input by a trader.
2. Cancel Request—The trader request cancellation of a previously entered trading order or hedging strategy.
3. Replace an old Order with a new Order—The trader request replacement or modification of an outstanding trading order or hedging strategy.

Events generated in response to market and exchange activity can include:
1. Order Acknowledged—Notification is received from an exchange acknowledging the insertion of a trading order in the exchange's order book.
2. Order Partially Filled—Notification is received from an exchange that an order has been partially filled.
3. Order Filled—Notification is received from an exchange that the order has been completely filled.
4. Order Done For Day—Notification is received from an exchange that an order has been cancelled from the order book due to the termination of the trading day.
5. Order Cancelled—Notification is received from an exchange that an order has been cancelled from the order book.
6. Order Replaced—Notification is received from an exchange that an old order has been replaced with a new one.
7. Order Pending Cancel—Notification that a request to cancel an order has been put on hold by an exchange.
8. Order Stopped—Notification is received from an exchange that the trading on the order's stock has been stopped.
9. Order Rejected—Notification is received from an exchange that an order has been rejected.
10. Order Suspended—Notification is received from an exchange that the trading in the stock for which we have an order in the order book has been suspended.
11. Order Pending New—Notification is received from an exchange that the request to insert a new order in the order book has been put on hold.
12. Order Expired—Notification is received from an exchange that the lifetime of the order has expired.
13. Order Restated—Notification is received from an exchange that one or more of the attributes of order (i.e. quantity, price, . . . ) has changed.
14. Order Pending Replace—Notification is received from an exchange that the replace request has been put on hold.
15. Order Cancel Rejected—Notification is received from an exchange that a cancel request has been rejected is received from an exchange.

In response to the foregoing events, and/or due to other changes in market, account, and order status, the interface 300 can be updated in real-time. For example, as trades are made, gateway 202 may transmits data to terminal 201 to cause the terminal 201 to display updated information regarding executions occurring for each stock/account combination.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, automatic estimates of the hedge levels may be based on time series data of the underlying stock and risk parameters ($\Delta$, $\Gamma$, $\sigma$) may be calculated and updated in real-time to allow more precise hedging. The invention may also be applied to hedge other types of financial instruments having a value that is related to an underlying stock or traded instrument. For example, convertible bonds may be hedged using the invention. In the case of convertible bonds, the risk system and interface treat the convertible bond the same as a plain vanilla option (i.e., risk is assessed based on the underlying stock and the underlying stock is what is shown on the interface 300). Accordingly, other embodiments are within the scope of the following claims.

What is claimed is:

1. A computer-implemented method for generating hedging orders, the method comprising:
calculating a volatility factor associated with a first financial instrument;
generating a first stage of a multiple stage hedge sequence, wherein said first stage in the hedge sequence comprises:
a first order to hedge the first financial instrument by acquiring a first position in a second financial instrument at a first target price that is determined based on the volatility factor and a reference price; and
a second order to hedge the first financial instrument by acquiring an opposite position to said first position in the second financial instrument at a second target price that is determined based on said volatility factor and said reference price; and
transmitting the first and second orders to an exchange, such that both the first and the second orders are simultaneously pending and execution of the first or second orders is determined based on price movement of the second financial instrument.

2. The method of claim 1 wherein acquiring a position in the second financial instrument comprises acquiring a position selected from the group consisting of a short position and a long position in the second financial instrument.

3. The method of claim 1 wherein:
the first order comprises a buy order at a target price less than the current asking price.

4. The method of claim 3 wherein said second order to hedge comprises a sell order to sell the second financial instrument at a target price greater than the current bid price for the second financial instrument.

5. The method of claim 1 wherein the first financial instrument comprises an option on an underlying stock and the second financial instrument comprises the underlying stock of the first financial instrument.

6. The method of claim 1 wherein the volatility factor is selected from the group consisting of:
a percMove(σ) factor, wherein said percMove(σ) factor represents the daily volatility of the second financial instrument; and
a percMove factor, wherein said percMove factor represents a trader specified value.

7. The method of claim 6, wherein the first order to hedge the first financial instrument by acquiring a first position in a second financial instrument comprises a buy order with a target price, and wherein the target price of said buy order is calculated according to the following formula:

Buy Price=Reference Price*(100−percMove(σ))/100.

8. The method of claim 7, further comprising a buy quantity, wherein said buy quantity is calculated according to the following formula:

Buy Qty:=(percMove(σ)*Γ)/Buy Price, wherein $$\Gamma = \frac{\partial \Delta}{\partial S} = \frac{\partial C^2}{\partial^2 S},$$

wherein C is the first financial instrument price, S is the second financial instrument price and $$\Delta = \frac{\partial C}{\partial S}.$$

9. The method of claim 8, wherein said opposite position to said first position in the second financial instrument comprises a sell order with a target price and a sell quantity, wherein said target price of said sell order is calculated according to the following formula:

Sell Price=Reference Price*(100+percMove(σ))/100;

and wherein said sell order quantity is calculated according the following formula:

Sell Qty:=(percMove(σ)*Γ)/Sell Price.

10. The method of claim 6, wherein the first order to hedge the first financial instrument by acquiring a first position in a second financial instrument comprises a sell order with a target price, and wherein the target price of said sell order is calculated according to the following formula:

Sell Price=Reference Price*(100+percMove(σ))/100.

11. The method of claim 10, further comprising a sell quantity, wherein said sell quantity is calculated according to the following formula:

Sell Qty:=(percMove(σ)*Γ)/Sell Price, wherein $$\Gamma = \frac{\partial \Delta}{\partial S} = \frac{\partial C^2}{\partial^2 S},$$

wherein C is the first financial instrument price, S is the second financial instrument price and $$\Delta = \frac{\partial C}{\partial S}.$$

12. The method of claim 10, wherein said opposite position to said first position in the second financial instrument comprises a buy order with a target price and a buy quantity, wherein said target price of said buy order is calculated according to the following formula:

Buy Price=Reference Price*(100−percMove(σ))/100 and wherein said buy order quantity is calculated according the following formula:

Buy Qty:=(percMove(σ)*Γ)/Buy Price.

13. A computer-implemented method for generating a sequence of hedging orders to hedge the pricing volatility of a first financial instrument, comprising an option associated with an underlying second financial instrument, the method comprising:
determining a first buy price, a first buy quantity, a first sell price, and a first sell quantity, wherein the first buy price and the first sell price are based on an initial reference price and a volatility factor indicative of the percentage movement in the price of the second financial instrument at which a trader desires to hedge, and wherein the first buy quantity is based on a gamma factor, the volatility factor and the buy price; and the first sell quantity is based on the gamma factor, the volatility factor and the sell price;

generating a first stage of a hedging sequence for hedging the first financial instrument, the first stage comprising:
  a first buy order to purchase the second financial instrument specifying a buy quantity based on the first buy quantity, and a buy price based on the first buy price; and
  a first sell order to sell the second financial instrument specifying a sell quantity based on the first sell quantity, and a sell price based on the first sell price; and
transmitting the first buy order and the first sell order to the exchange such that execution of the first buy order or the first sell order is determined based on price movement of the second financial instrument.

14. A computer-implemented system for generating hedging orders, the system comprising:
a programmable processor adapted to:
  calculating a volatility factor associated with a first financial instrument;
  generating a first stage of a multiple stage hedge sequence, wherein said first stage in the hedge sequence comprises:
    a first order to hedge the first financial instrument by acquiring a first position in a second financial instrument at a first target price that is determined based on the volatility factor and a reference price; and
    a second order to hedge the first financial instrument by acquiring an opposite position to said first position in the second financial instrument at a second target price that is determined based on said volatility factor and said reference price; and
  transmitting the first and second orders to an exchange, such that both the first and the second orders are simultaneously pending and execution of the first or second orders is determined based on price movement of the second financial instrument.

15. The system of claim 14 wherein acquiring a position in the second financial instrument comprises acquiring a position selected from the group consisting of a short position and a long position in the second financial instrument.

16. The system of claim 14 wherein:
the first order comprises a buy order at a target price less than the current asking price.

17. The system of claim 16 wherein said second order to hedge comprises a sell order to sell the second financial instrument at a target price greater than the current bid price for the second financial instrument.

18. The system of claim 14 wherein the first financial instrument comprises an option on an underlying stock and the second financial instrument comprises the underlying stock of the first financial instrument.

19. The system of claim 14 wherein the volatility factor is selected from the group consisting of:
  a $percMove(\theta)$ factor, wherein said $percMove(\theta)$ factor represents the daily volatility of the second financial instrument; and
  a $percMove$ factor, wherein said $percMove$ factor represents a trader specified value.

20. The system of claim 19, wherein the first order to hedge the first financial instrument by acquiring a first position in a second financial instrument comprises a buy order with a target price, and wherein the target price of said buy order is calculated according to the following formula:

Buy Price =Reference Price *(100- $percMove(\theta)$)/100.

21. The system of claim 20, further comprising a buy quantity, wherein said buy quantity is calculated according to the following formula:

Buy Qty: =($percMove(\theta)$)* $\Gamma$)/Buy Price, wherein $$\Gamma = \frac{\partial \Delta}{\partial S} = \frac{\partial C^2}{\partial^2 S},$$

wherein C is the first financial instrument price, S in the second financial instrument price and $$\Delta = \frac{\partial C}{\partial S},$$

22. The system of claim 21, wherein said opposite position to said first position in the second financial instrument comprises a sell order with a target price and a sell quantity, wherein said target price of said sell order is calculated according to the following formula:

Sell Price =Reference Price * (100 +$percMove(\theta)$)/100;

and wherein said sell order quantity is calculated according to the following formula:

Sell Qty: =($percMove(\theta)$ * $\Gamma$)/Sell Price.

23. The system of claim 19, wherein the first order to hedge the first financial instrument by acquiring a first position in a second financial instrument comprises a sell order with a target price, and wherein the target price of said sell order is calculated according to the following formula:

Sell Price =Reference Price * (100 +$percMove(\theta)$)/100.

24. The system of claim 23, further comprising a sell quantity, wherein said sell quantity is calculated according to the following formula:

Sell Qty: =($percMove(\theta)$ * $\Gamma$)/Sell Price, wherein $$\Gamma = \frac{\partial \Delta}{\partial S} = \frac{\partial C^2}{\partial^2 S},$$

wherein C is the first financial instrument price, S is the second financial instrument price and $$\Delta = \frac{\partial C}{\partial S},$$

25. The system of claim 24, wherein said opposite position to said first position in the second financial instrument comprises a buy order with a target price and a buy quantity, wherein said target price of said buy order is calculated according to the following formula:

Buy Price =Reference Price * (100- $percMove(\theta)$)/100 and wherein said buy order quantity is calculated according the following formula:

Buy Qty:=($percMove(\theta)$ * $\Gamma$)/Buy Price.

26. A computer-implemented system for generating a sequence of hedging orders to hedge the pricing volatility of a first financial instrument, comprising an option associated with an underlying second financial instrument, the system comprising:

a programmable processor adapted to:

determining a first buy price, a first buy quantity, a first sell price, and a first sell quantity, wherein the first buy price and the first sell price are based on an initial reference price and a volatility factor indicative of the percentage movement in the price of the second financial instrument at which a trader desires to hedge, and wherein the first buy quantity is based on a gamma factor, the volatility factor and the buy price; and the first sell quantity is based on the gamma factor, the volatility factor and the sell price;

generating a first stage of a hedging sequence for hedging the first financial instrument, the first stage comprising:

a first buy order to purchase the second financial instrument specifying a buy quantity based on the first buy quantity, and a buy price based on the first buy price; and         a first sell order to sell the second financial instrument specifying a sell quantity based on the first sell quantity, and a sell price based on the first sell price; and     transmitting the first buy order and the first sell order to the exchange such the execution of the first buy order or the first sell order is determined based on price movement of the second financial instrument.

* * * * *